Dec. 22, 1959     S. S. HELD ET AL     2,917,758
ELECTRICALLY CONTROLLED TOOTH-BRUSH
Filed March 30, 1956
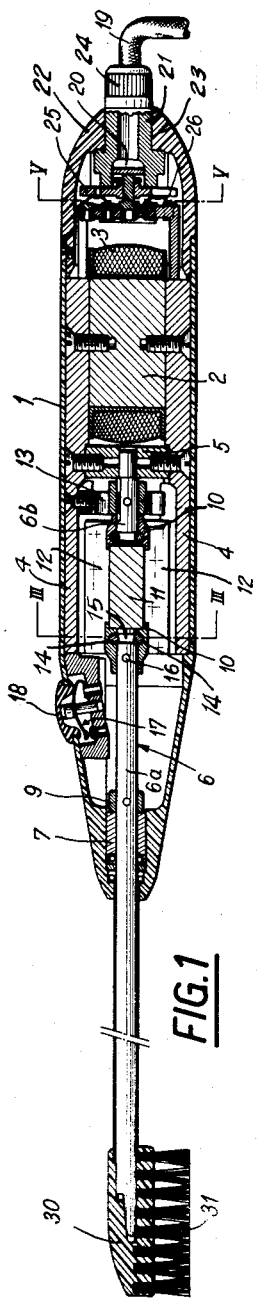
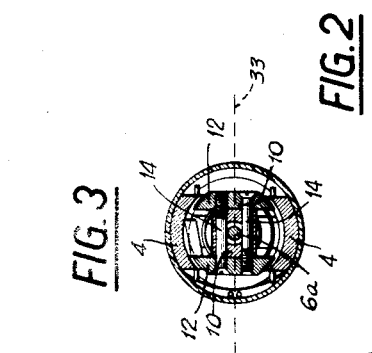
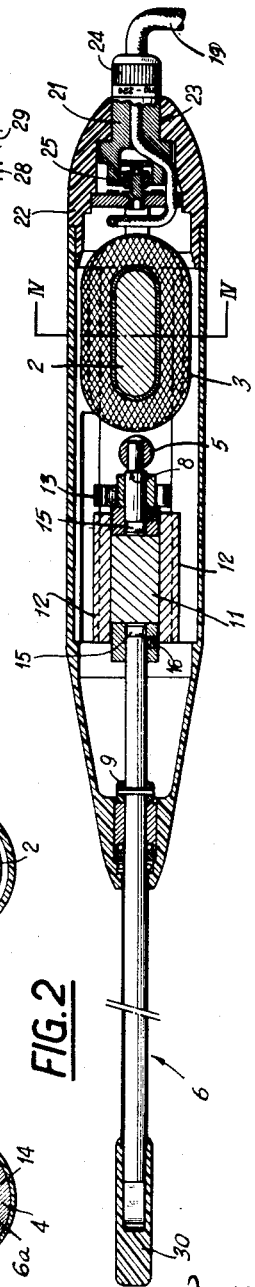
Inventors:
Serge Simon Held
André A. Miéville
Philippe Guy Woog
by: J. Delettre Seguy
Attorney United States Patent Office 2,917,758
Patented Dec. 22, 1959

2,917,758
ELECTRICALLY CONTROLLED TOOTH-BRUSH

Serge Simon Held, Paris, France, and André Auguste Mieville, Lausanne, and Philippe Guy Woog, Geneva, Switzerland, assignors to AESUP, Vaduz, Liechtenstein, a firm of Liechtenstein Application March 30, 1956, Serial No. 575,076

Claims priority, application Switzerland February 21, 1956

15 Claims. (Cl. 15—22)

Our invention has for its object an electrically operated tooth-brush which allows cleaning efficiently one's teeth in accordance with the best technique proposed by dentists and stomatologists. It is known that the latter advise brushing the teeth in the direction of the intervals between the latter so as to remove the tartar, and to drive out the particles of foodstuff and repeating this operation as often as possible, which is a tedious, inconvenient and lengthy business when one proceeds with an ordinary tooth brush held in one's hand. Our invention substitutes thus for the hand of the operator a mechanical much more efficient control providing a better result within a much shorter time since it is possible to obtain mechanical movements which are much more rapid and more accurately directed than those executed hitherto by hand; in the case of our invention, the hand serves only in a passive manner for carrying and guiding the toothbrush.

Our improved brush includes an elongated casing forming a handle and enclosing an electrical motor which produces rotational oscillation of a shaft projecting outside the casing, the inner section of said shaft carrying the rotor of the motor and its outer section the head of the brush.

According to an important feature of our invention, said motor is an alternating current motor including an angularly reciprocating (rotationally oscillating) rotor imparting to the head of the brush a rocking movement round the axis of said shaft.

We have illustrated in the accompanying drawings by way of example a preferred embodiment of our invention. In said drawings:

Figs. 1 and 2 show the complete tooth brush in longitudinal cross-sectional views in two orthogonal planes.

Figs. 3, 4 and 5 are cross-sections respectively through line III—III of Fig. 1, IV—IV of Fig. 2 and V—V of Fig. 1.

Fig. 6 is a wiring diagram.

The tooth-brush illustrated includes a casing 1 of an approximately elliptic shape made of soft material, for instance, or polyethylene or the like thermoplastic material which hardens upon cooling. Inside said casing forming a handle is fitted without any securing screw an electric motor fed with alternating current and including an oscillatable rotor. Said casing, which is a perfectly fluidtight casing, provides complete electrical safety by reason of the elimination of any metal element liable to engage the operator's hand or mucous membranes.

The motor inside the brush casing includes a stator comprising an electromagnet formed by an oval core 2 arranged perpendicularly to the longitudinal axis of the brush and surrounded by the winding 3, and two pole-pieces 4 attached to core 2 and extending longitudinally of the casing. As shown in Fig. 4, the arcuate cross-section of the outer surface of the pole pieces matches the inner wall of the casing. An upright 5 (Fig. 1) of non-magnetic material is secured between the pole-pieces 4. The rotor is carried by the steel shaft 6, enclosed if required inside a sheath of soft material, and it includes a permanent magnet 11 and pole-pieces of mild iron 12 (Fig. 3). Said rotor is urged back into its rest position (as shown) by the return spring 13.

The magnetic axis of the rotor magnet 11 is directed perpendicularly to the stator flux when the rotor is in its rest position. as shown. Magnet 11 is provided with pole-pieces 12 which are diametrically opposed to each other. Each pole-piece may be considered to consist of two half-sections on opposite sides of the dash line 33 (Fig. 3). These half-sections are symmetrically located with reference to the magnetic axis of the magnet 11 and are adapted to form a bridge to either side of the rotor between the pole-pieces 4 of the stator. When an alternating voltage is applied to the stator coil 3, the stator field and the field of the permanent magnet 11 are added to each other in two diametrically opposed half-sections of the pole-pieces 12 and are subtracted from each other in the two other diametrically opposed half-sections, the addition and subtraction alternating between pairs of half-sections in accordance with the changes in direction of the alternating current. The result is that the rotor is subjected to a reciprocating torque which causes it to rock at the frequency of the voltage applied. Since the brush described is to be connected with the public mains, it will vibrate at the frequency of the latter, say 50 to 60 periods per second, which frequency range has proved during experimentation as the most suitable for the brushing of one's teeth and for the massaging of one's gums. In order that the amplitude of the rocking movement of the brush may be as large as possible so as to provide a maximum efficiency of the brush, the moment of inertia of the rotor of the motor and the characteristic properties of its spring 13 are selected in a manner such that the natural mechanical resonant frequency of oscillation of the rotor may be equal to the frequency of the mains.

The upright 5 forms one of the bearings of the shaft 6, the other bearing of which is constituted by the outer end 7 of the casing. A thrust bearing 8 and a ring 9 serve for limiting the axial shifting of the shaft. Said shaft 6 is constituted by two alined spaced sections 6a and 6b, the ends facing each other carrying jaws 10 made of brass and between which is fitted the permanent rotor magnet 11. Each jaw 10 is secured to the two pole-pieces holding fast between them the magnet, as provided by the two screws 14 passing through the jaws 10 and the pole-pieces 12. Each section of the shaft being secured to the corresponding jaw through a small screw 16. A circumferential groove 15 is provided in each section of the shaft to accommodate screws 14. Thus it is possible to adjust the angular setting of the rotor with reference to the two sections of the shaft 6 before tightening set screws 16. To the inner section 6b is secured one of the ends of the rotor returning coil spring 13, the other end of which is secured to the stator (Fig. 1).

Switch 17 is mounted inside the casing and may be actuated through a control knob 18 fluidtightly fitted inside an opening in the casing wall. This knob is the only outwardly apparent part of the switch, and is constituted by a convex rubber disc secured in an opening of the casing by a force fit engagement of the edge of said opening with an annular groove formed along the periphery of said disc. Said switch allows the user of the brush to start and stop instantaneously the motor through a mere pressure exerted by a finger on the rubber knob 18, whereby the motor circuit is controlled.

Cable 19 is a two-wire feeding cable entering the casing through a switch 20 which allows connecting the brush selectively with mains operating under voltages of 110 and 220 volts respectively. Said switch is constituted by a socket 21 revolving fluidtightly inside an axial cylindrical opening 23 formed in the end 22 of the casing. Said socket is provided at its outer end with a control knob 24 and at its inner end with a small insulating plate 25 adapted to occupy selectively two angular positions illustrated in dot and dash lines in Fig. 6 of the drawings. Said small plate 25 carries conductive tongues 26 cooperating with contact pieces 27 connecting in series or in parallel, according to the position of the switch, two component coils 28 and 29 of the electromagnet winding 3.

The removable brush head 30, provided with bristles 31, is attached to the outer end of the shaft 6 through cooperating oblique planes of corresponding slopes which allow reliably mounting the head on the shaft, said head being also secured to the shaft through the agency of a small locking ball if desired. Said head is made also of soft material similarly to the casing so as to prevent any too harsh shocks on the teeth if the head were to engage the latter instead of the bristles.

The tests to which the above described brush has been subjected have provided excellent results proving its easy handling, its strength and its efficiency. Its structure is designed in a particularly careful manner and leads to important advantages. It should be noted that when the brush is worn out, only the head (which is cheap) need be replaced. It is also possible for a whole family to use the same brush with a plurality of interchangeable heads, each member of the family keeping a tooth-brush head for his own use. Furthermore there is no risk of damaging or overheating the motor when the head rocking with the rotor is braked or locked through its being urged too energetically against the teeth. However, it is practically impossible to stop the motor in such a manner since it provides in spite of its small bulk a power which is far higher than those of conventional motors of the same category.

What we claim is:

1. In an electrically operated toothbrush, the combination which comprises a casing forming a handle, a rotationally oscillating electric motor mounted in said casing, said motor having a stator and a rotor cooperating therewith a rotor shaft mounting said rotor and extending through said casing, a brush head outside said casing and attached to the end of said rotor shaft, and means for energizing said motor to produce rotational oscillation of said rotor and rotor shaft and thereby said brush head.

2. In an electrically operated toothbrush, the combination which comprises a watertight casing forming a handle, a rotationally oscillating electric motor mounted in said casing, said motor having a stator and a rotor cooperating therewith, a rotor shaft mounting said rotor and extending through said casing in substantially watertight relationship therewith, a brush head outside said casing and attached to the end of said rotor shaft, and means for energizing said motor to produce rotational oscillation of said rotor and rotor shaft and thereby of said brush head.

3. In an electrically operated toothbrush, the combination which comprises an elongated casing forming a handle, a rotationally oscillating electric motor mounted in said casing, said motor having a stator and a rotor cooperating therewith, a rotor shaft mounting said rotor and extending longitudinally of said casing and through one end thereof, a brush head outside said casing and attached to the end of said rotor shaft, and means for energizing said motor to produce rotational oscillation of said rotor and rotor shaft and thereby of said brush head.

4. In an electrically operated toothbrush, the combination which comprises an elongated casing forming a handle, a synchronously oscillating A.-C. electric motor having a stator and a rotor cooperating therewith, a rotor shaft mounting said rotor for rotational oscillation, said motor being mounted in said casing with said rotor shaft extending longitudinally of said casing and through one end thereof, elastic means for urging said rotor to a predetermined angular position with respect to said stator, a brush head outside said casing and attached to the end of said rotor shaft, and means for energizing said stator with alternating current to produce rotational oscillation of said rotor in synchronism with said alternating current and thereby of said brush head.

5. In an electrically operated toothbrush, the combination which comprises an elongated casing forming a handle, a synchronously oscillating A.-C. electric motor having a stator and a rotor cooperating therewith, a rotor shaft mounting said motor for rotational oscillation, said motor being mounted in said casing with said rotor shaft extending longitudinally of said casing and through one end thereof, elastic means providing a restoring force for urging said rotor to a predetermined angular position with respect to said stator, a brush head outside said casing and attached to the end of said rotor shaft, and means for energizing said stator with alternating current to produce rotational oscillation of said rotor in synchronism with said alternating current and thereby of said brush head, said elastic means being predetermined to produce a natural mechanical resonant frequency of oscillation of said rotor which is substantially equal to the frequency of said alternating current.

6. In an electrically operated toothbrush, the combination which comprises an elongated casing forming a handle, an A.-C. electric motor having a stator and a rotor cooperating therewith, said motor being adapted to oscillate synchronously at the A.-C. frequency applied thereto, a rotor shaft mounting said rotor for rotational oscillation, said motor being mounted in said casing with said rotor shaft extending longitudinally of said casing and through one end thereof, elastic means providing a restoring force for urging said rotor to a predetermined angular position with respect to said stator, a brush head outside said casing and attached to the end of said rotor shaft, and means for energizing said stator with alternating current at a frequency in the range of approximately 50 to 60 cycles per second to produce rotational oscillations of said rotor of corresponding frequency and thereby of said brush head, said elastic means being predetermined to produce a natural mechanical resonant frequency of oscillation of said rotor in said range.

7. In an electrically operated toothbrush, the combination which comprises a casing forming a handle, a rotationally oscillating electric motor having a rotor and a stator mounted in said casing, said stator having a core comprising a pair of spaced legs extending in a predetermined direction and a core section joining said legs near one end thereof, said rotor being mounted between the other ends of said legs on a rotor shaft extending in said predetermined direction and through said casing, a brush head outside said casing and attached to the end of said rotor shaft, and means for energizing said motor to produce rotational oscillation of said rotor and rotor shaft and thereby of said brush head.

8. In an electrically operated toothbrush, the combination which comprises an elongated casing forming a handle, a rotationally oscillating electric motor having a rotor and a stator mounted in said casing, said stator having a core comprising a pair of spaced legs extending longitudinally of said casing and a transverse section joining said legs near one end thereof, said rotor being mounted between the other ends of said legs on a rotor shaft extending longitudinally of said casing, said rotor shaft extending through one end of said casing and having a brush head attached thereto outside said casing, and means for energizing said motor to produce rotational oscillation of said rotor and rotor shaft and thereby of said brush head.

9. In an electrically operated toothbrush, the combination which comprises an elongated casing forming a handle, an electromagnetic stator mounted in said casing having a core comprising a pair of spaced legs extending longitudinally of said casing and a transverse section joining said legs near one end thereof, the other ends of said legs forming pole sections substantially symmetrical with respect to a plane therethrough extending longitudinally of said casing, a coil encircling said transverse section, a rotor positioned between said pole sections, a rotor shaft mounting said rotor for rotation about an axis extending longitudinally of said casing and substantially in said plane of symmetry, said rotor including a permanent magnet having magnetic poles on diametrically opposite sides of said axis and said rotor shaft extending through one end of said casing and having a brush head attached thereto outside said casing, elastic means for urging said rotor to a predetermined angular position in which a plane of substantial symmetry through said magnetic poles and axis is approximately perpendicular to said plane of symmetry of the stator pole sections, and means for energizing said stator coil with alternating current to produce rotational oscillation of said rotor and thereby of said brush head.

10. In an electrically operated toothbrush, the combination which comprises an elongated casing forming a handle, an electromagnetic stator mounted in said casing having a core comprising a pair of spaced legs extending longitudinally of said casing and a transverse section joining said legs near one end thereof, the other ends of said legs forming pole sections substantially symmetrical with respect to a plane therethrough extending longitudinally of said casing, the inner surfaces of said pole sections forming portions of a cylindrical surface having a longitudinally extending axis lying substantially in said plane of symmetry, a coil encircling said transverse section, a rotor positioned between said pole sections, a rotor shaft mounting said rotor for rotation about said axis and extending through one end of said casing, said rotor including a permanent magnet having magnetic poles on diametrically opposite sides of said axis and soft iron pole pieces fixed to said permanent magnet at the respective magnetic poles thereof, said rotor having a plane of symmetry passing through said magnetic poles and said axis, said soft iron pole pieces extending into close proximity with the inner surfaces of said stator pole sections and the spacing between said permanent magnet and said stator pole sections being substantially greater, elastic means for urging said rotor to an angular position in which said rotor plane of symmetry is approximately perpendicular to said plane of symmetry of the stator pole sections, a brush head outside said casing and attached to the end of said rotor shaft, and means for energizing said stator coil with alternating current to produce rotational oscillation of said rotor in synchronism therewith and thereby synchronous rotational oscillation of said brush head.

11. In an electrically operated toothbrush, the combination which comprises an elongated casing forming a handle, an electromagnetic stator mounted in said casing having a core comprising a pair of spaced legs extending longitudinally of said casing and a transverse section joining said legs near one end thereof, the other ends of said legs forming pole sections substantially symmetrical with respect to a plane therethrough extending longitudinally of said casing, the inner surfaces of said pole sections forming portions of a cylindrical surface having a longitudinally extending axis lying substantially in said plane of symmetry, a coil encircling said transverse section, a rotor positioned between said pole sections, a rotor shaft mounting said rotor for rotation about said axis and extending through one end of said casing, said rotor including a permanent magnet having magnetic poles on diametrically opposite sides of said axis and soft iron pole pieces fixed to said permanent magnet at the respective magnetic poles thereof, said rotor having a plane of symmetry passing through said magnetic poles and said axis, said soft iron pole pieces extending into close proximity with the inner surfaces of said stator pole sections and the spacing between said permanent magnet and said stator pole sections being substantially greater, elastic means for urging said rotor to an angular position in which said rotor plane of symmetry is approximately perpendicular to said plane of symmetry of the stator pole sections, a brush head outside said casing and attached to the end of said rotor shaft, and means for energizing said stator coil with alternating current to produce rotational oscillation of said rotor in synchronism therewith and thereby synchronous rotational oscillation of said brush head, said elastic means being predetermined to produce a natural mechanical resonant frequency of oscillation of said rotor which is substantially equal to the frequency of said alternating current.

12. In an electrically operated toothbrush, the combination which comprises an elongated casing forming a handle, an electromagnetic stator mounted in said casing having a core comprising a pair of spaced legs extending longitudinally of said casing and a transverse section joining said legs near one end thereof, the other ends of said legs forming pole sections substantially symmetrical with respect to a plane therethrough extending longitudinally of said casing, the inner surfaces of said pole sections forming portions of a cylindrical surface having a longitudinally extending axis lying substantially in said plane of symmetry, a coil encircling said transverse section, a rotor positioned between said pole sections, a rotor shaft mounting said rotor for rotation about said axis and extending through one end of said casing, said rotor including a permanent magnet having magnetic poles on diametrically opposite sides of said axis and soft iron pole pieces fixed to said permanent magnet at the respective magnetic poles thereof, said rotor having a plane of symmetry passing through said magnetic poles and said axis, said soft iron pole pieces extending into close proximity with the inner surfaces of said stator pole sections and the spacing between said permanent magnet and said stator pole sections being substantially greater, elastic means for urging said rotor to an angular position in which said rotor plane of symmetry is approximately perpendicular to said plane of symmetry of the stator pole sections, a brush head outside said casing and attached to the end of said rotor shaft, and means for energizing said stator coil with alternating current at a frequency in the range of approximately 50 to 60 cycles per second to produce rotational synchronous oscillations of said rotor of corresponding frequency and thereby of said brush head, said elastic means being predetermined to produce a natural mechanical resonant frequency of oscillation of said rotor in said range.

13. An electrically-operated hand appliance for personal care in which a working head is rotationally oscillated in contact with the body which comprises a casing forming a handle, a synchronously oscillating A.-C. electric motor having a stator and a rotor cooperating therewith, a rotor shaft mounting said rotor for rotational oscillation, said motor being mounted in said casing with said rotor shaft extending through said casing, a working head outside said casing and attached to the end of said rotor shaft, said working head being adapted for working contact with the body, elastic means for urging said rotor to a predetermined angular position with respect to said stator, and means for energizing said stator with alternating current to produce rotational oscillation of said rotor in synchronism with said alternating current and thereby of said working head.

14. An electrically-operated hand appliance for personal care in which a working head is rotationally oscillated in contact with the body which comprises a casing forming a handle, a synchronously rotationally oscillating electric motor having a rotor and a stator mounted in said casing, said stator having a core comprising a pair of spaced legs extending in a predetermined direction and a core section joining said legs near one end thereof, said rotor being mounted between the other ends of said legs on a rotor shaft extending in said predetermined direction and including a permanent magnet having magnetic poles on diametrically opposite sides of the axis of rotation thereof, said rotor shaft extending through said casing, a working head outside said casing and attached to the end of said rotor shaft, said working head being adapted for working contact with the body, elastic means for urging said rotor to a predetermined angular position with respect to said stator, and means for energizing said stator with alternating current to produce rotational oscillation of said rotor in synchronism with said alternating current and thereby of said working head.

15. An electrically-operated hand appliance for personal care in which a working head is rotationally oscillated in contact with the body which comprises an elongated casing forming a handle, an electromagnetic stator mounted in said casing having a core comprising a pair of spaced legs extending longitudinally of said casing and a transverse section joining said legs near one end thereof, the other ends of said legs forming pole sections substantially symmetrical with respect to a plane therethrough extending longitudinally of said casing, the inner surfaces of said pole sections forming portions of a cylindrical surface having a longitudinally extending axis lying substantially in said plane of symmetry, a coil encircling said transverse section, a rotor positioned between said pole sections, a rotor shaft mounting said rotor for rotation about said axis and extending through one end of said casing, said rotor including a permanent magnet having magnetic poles on diametrically opposite sides of said axis and having a plane of symmetry passing through said magnetic poles and said axis, elastic means for urging said rotor to an angular position in which said rotor plane of symmetry is approximately perpendicular to said plane of symmetry of the stator pole sections, a working head outside said casing and attached to the end of said rotor shaft, said working head being adapted for working contact with the body, and means for energizing said stator coil with alternating current to produce rotational oscillation of said rotor in synchronism therewith and thereby synchronous rotational oscillation of said working head.

References Cited in the file of this patent

UNITED STATES PATENTS

| | | |
|---|---|---|
| 1,851,543 | Bossard | Mar. 29, 1932 |
| 2,158,738 | Baker et al. | May 16, 1939 |
| 2,226,145 | Smith | Dec. 24, 1940 |
| 2,278,365 | Daniels | Mar. 31, 1942 |
| 2,319,205 | Buck | May 18, 1943 |
| 2,736,048 | Gregoire | Feb. 2, 1956 |

FOREIGN PATENTS

| | | |
|---|---|---|
| 424,044 | Great Britain | Feb. 13, 1935 |